R. M. HINE.
Hay and Manure Fork.
No. 15,976.
Patented Oct. 28. 1856.
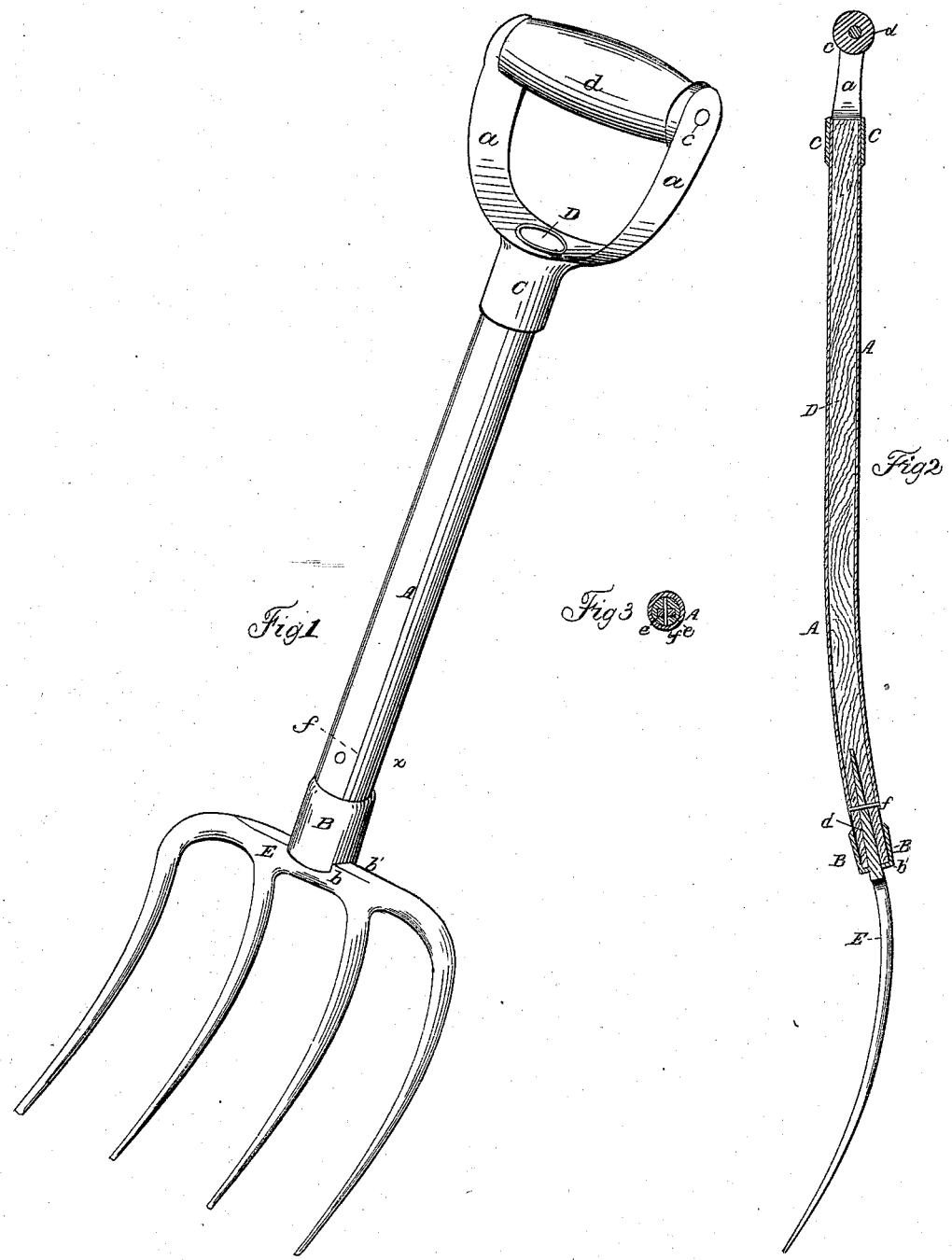

UNITED STATES PATENT OFFICE.

REUBEN M. HINE, OF THROOPSVILLE, NEW YORK.

IMPROVEMENT IN THE HANDLES OF AGRICULTURAL FORKS, SHOVELS, AND HOES.

Specification forming part of Letters Patent No. 15,976, dated October 28, 1856.

*To all whom it may concern:*

Be it known that I, REUBEN M. HINE, of Throopsville, in the county of Cayuga and State of New York, have invented a new and useful Improvement in the Handles of Agricultural Forks, Shovels, and Hoes; and I do hereby declare that the following is a full, clear, and exact description of the same, reference being had to the annexed drawings, making a part of this specification, in which—

Figure 1 is a perspective view, Fig. 2 a longitudinal section, and Fig. 3 a transverse section, (at $x$, in Fig. 1,) of a manure fork made according to my invention.

The same letters relate to like parts in all the figures.

My invention consists in the improvement of making the handle of a fork, shovel, or hoe of a thin tube of tenacious metal closely filled with wood, as hereinafter fully described, instead of making a handle for such an implement wholly of wood, as is the common practice, and also in contradistinction from making the handle of an unfilled metallic tube. By this improvement I am enabled to make a fork, shovel, or hoe with a first-rate handle at less cost than can be done when the handle of such an implement is made wholly of wood or of a metallic tube unfilled.

To enable others skilled in the manufacture of agricultural implements to make forks, shovels, and hoes with handles formed according to my invention I now describe their construction.

I first prepare a metallic tube, A, of the proper thickness, diameter, and length for the handle to be made. This may be formed of any suitable tenacious metal and in any of the usual modes of making strong and smooth metallic tubes. In general, I prefer to make them by brazing together the edges of a strip of sheet-iron. Common iron gas-pipe of the proper size may be used.

If the handle be designed for a manure-fork, I then prepare a suitable metallic socket ferrule, B, having projections $b$ $b'$ to embrace the fork at its shank, and fasten this ferrule by brazing or in some other suitable manner to the lower end of the tube A, and also prepare a suitable head-piece of the usual form, which may consist of the malleable cast-iron socket C, having stirrup-arms $a$ $a'$ to hold the ends of the cross-rod $c$, on which the hand-piece $d$ is to turn, and secure this socket upon the top end of the tube A by means of a rivet, or in some other suitable manner. A head thus constructed will also be suitable for the handle of a spade, shovel, or grain-scoop. I then fill the tube A its whole length, or nearly its whole length, with a piece of seasoned wood, D. Almost any light wood will do, and it is not essential that it should be of the best quality. By thus filling the tube with wood I greatly increase the strength of the handle, and hence can make the tube of thinner metal than if it were not thus filled.

If it is desired to have the handle curved, I then bend it to the required form, which bending can be done cold by the use of clamps of the proper form, or in any other convenient way. A suitable hole or socket for the tang or shank of the fork may be made in the lower end of the wood which fills the tube either before or after the wood is inserted. A fork, E, having been previously made in the usual form and manner, its shank $e$ is inserted within its socket in the handle and there secured by means of a screw, pin, or rivet, $f$, passing through the handle and tang; or the fork E and handle may be fastened together in any other suitable manner. Then, after inserting the hand-roller $d$, the whole fork and handle is polished on emery wheels, so that the body A of the handle shall slide freely through the hands of the laborer when he is using the fork, and so as to make a nicely finished implement throughout. The handle represented in the drawings is also a good one for an earth-shovel or grain-scoop, and the blades of these may be fastened to their handles by modes which are most suitable or which best accord with the convenience or taste of the manufacturer.

I make the handles of hoes of the proper length and diameter and according to the general mode hereinbefore described—that is, of a thin tube of tenacious metal filled with wood, but of course without head-pieces, and attach the handles to their blades in any of the well-known ways which shall be most suitable or convenient.

I do not claim any mode of fastening the handle to the piercing or cutting part of a fork, shovel, or hoe. Neither do I claim any mode of constructing the head-piece or of attaching it to the handle; and I disclaim making the handle of any implement whatever of metal or of an unfilled metallic tube.

What I claim as my invention, and desire to secure by Letters Patent, is—

The improvement of making the handle of an agricultural fork, shovel, hoe, or equivalent implement of a metallic tube filled with wood, as herein described, whereby the advantage specified is secured.

REUBEN M. HINE.

Witnesses:
F. G. DAY,
GEO. HUMPHREYS.